(12) United States Patent
Chan et al.

(10) Patent No.: US 9,912,485 B2
(45) Date of Patent: Mar. 6, 2018

(54) METHOD AND APPARATUS FOR EMBEDDING SECRET INFORMATION IN DIGITAL CERTIFICATES

(71) Applicant: ARRIS Technology, Inc., Suwanee, GA (US)

(72) Inventors: Tat Keung Chan, San Diego, CA (US); Alexander Medvinsky, San Diego, CA (US); Eric J. Sprunk, Carlsbad, CA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 146 days.

(21) Appl. No.: 14/812,153

(22) Filed: Jul. 29, 2015

(65) Prior Publication Data

US 2015/0333915 A1     Nov. 19, 2015

Related U.S. Application Data

(62) Division of application No. 13/842,110, filed on Mar. 15, 2013, now abandoned.

(51) Int. Cl.
*H04L 9/32* (2006.01)
*H04L 29/06* (2006.01)
*H04L 9/30* (2006.01)
*G06F 21/33* (2013.01)
*H04L 9/08* (2006.01)

(52) U.S. Cl.
CPC .......... *H04L 9/3263* (2013.01); *G06F 21/335* (2013.01); *H04L 9/30* (2013.01); *H04L 9/3242* (2013.01); *H04L 9/3265* (2013.01); *H04L 9/3268* (2013.01); *H04L 2209/24* (2013.01); *H04L 2209/64* (2013.01)

(58) Field of Classification Search
CPC ... G06F 21/33; G06F 21/335; H04L 2209/24; H04L 2209/64; H04L 2209/38; H04L 9/30; H04L 9/321; H04L 9/3213; H04L 9/3242; H04L 9/3263; H04L 9/3265; H04L 9/3268; H04L 9/3236; H04L 63/0823; G06Q 20/38215
See application file for complete search history.

(56) References Cited

U.S. PATENT DOCUMENTS 5,218,637 A * 6/1993 Angebaud ............ G06Q 20/341
                                                          705/67
6,085,320 A * 7/2000 Kaliski, Jr. ............. G06F 21/33
                                                          713/168
6,202,151 B1 * 3/2001 Musgrave .............. G06Q 20/04
                                                          713/170

(Continued)

FOREIGN PATENT DOCUMENTS

WO        9743842 A1    11/1997

OTHER PUBLICATIONS

Farrell, S., and R. Housley. "An Internet Attribute Certificate Profile for Authorization", RFC 3281. (2002).*

(Continued)

*Primary Examiner* — Michael Simitoski
(74) *Attorney, Agent, or Firm* — Thomas A. Ward

(57) ABSTRACT

A method and system is provided for embedding cryptographically modified versions of secret in digital certificates for use in authenticating devices and in providing services subject to conditional access conditions.

11 Claims, 5 Drawing Sheets

(56) References Cited

U.S. PATENT DOCUMENTS

| | | | |
|---|---|---|---|
| 6,397,329 B1 | 5/2002 | Aiello et al. | |
| 6,993,658 B1* | 1/2006 | Engberg | G06F 21/43 379/114.2 |
| 7,461,250 B1* | 12/2008 | Duane | H04L 9/3263 713/157 |
| 2002/0032857 A1* | 3/2002 | Kon | G06Q 20/40 713/156 |
| 2002/0126846 A1* | 9/2002 | Multerer | A63F 13/12 380/251 |
| 2003/0131264 A1* | 7/2003 | Huff | H04L 63/083 726/3 |
| 2004/0221158 A1* | 11/2004 | Olkin | H04L 9/3236 713/170 |
| 2005/0027987 A1* | 2/2005 | Neufeld | G06F 21/31 713/176 |
| 2005/0138360 A1* | 6/2005 | Kamalakantha | G06F 21/606 713/156 |
| 2005/0228999 A1* | 10/2005 | Jerdonek | H04L 63/0823 713/176 |
| 2006/0004662 A1* | 1/2006 | Nadalin | H04L 63/02 705/50 |
| 2006/0036480 A1* | 2/2006 | Goldschlag | G06Q 20/04 705/12 |
| 2006/0047949 A1* | 3/2006 | Brown | H04L 9/3265 713/156 |
| 2006/0059333 A1* | 3/2006 | Gentry | H04L 9/3236 713/156 |
| 2006/0072527 A1* | 4/2006 | Beck | G06F 21/34 370/338 |
| 2006/0242405 A1 | 10/2006 | Gupta et al. | |
| 2006/0294366 A1* | 12/2006 | Nadalin | H04L 63/061 713/156 |
| 2007/0044143 A1 | 2/2007 | Zhu et al. | |
| 2007/0256125 A1 | 11/2007 | Chen et al. | |
| 2008/0235513 A1 | 9/2008 | Foster et al. | |
| 2009/0222656 A1* | 9/2009 | Rouskov | H04L 9/3213 713/155 |
| 2010/0042848 A1* | 2/2010 | Rosener | G06F 21/32 713/184 |
| 2011/0090086 A1* | 4/2011 | Dicks | A61B 5/1112 340/573.4 |
| 2011/0158411 A1* | 6/2011 | Medvinsky | H04L 9/0833 380/279 |

OTHER PUBLICATIONS

PCT Search Report & Written Opinion, RE: Application No. PCT/US2014/020076, dated Jun. 3, 2014.

R. Housley, et al., "Internt X.509 Public Key Infrastructure Certificate and Certificate Revocation List (CRL) Profile", Network Working Group, Request for Comments: 3280, Apr. 2002.

* cited by examiner

METHOD AND APPARATUS FOR EMBEDDING SECRET INFORMATION IN DIGITAL CERTIFICATES

CROSS REFERENCE TO RELATED APPLICATION

This application is a divisional of U.S. patent application Ser. No. 13/842,110 filed Mar. 15, 2013 which is incorporated herein by reference herein in its entirety.

BACKGROUND OF THE INVENTION

Field of the Invention

The present invention relates to systems and methods for the secure provision of services to devices and in particular to a method and apparatus for embedding and using secret information in digital certificates.

Description of the Related Art

The widespread availability of digital means for disseminating information has placed an increasingly important emphasis on assuring the authenticity of a digital message, document, or data before providing access to other data. Authentication may be used as a part of a conditional access or digital rights management (DRM) scheme that protects information by requiring certain criteria to be met before the content can be stored, copied, played back, or otherwise used. The ability to satisfy this criteria is controlled so that only those entities authorized to use the information are able to do so.

Authentication of the source of information assures the recipient that the apparent or represented source is indeed the actual source. One of the techniques used for both conditional access and authentication is a public-key infrastructure (PKI).

In typical public-key infrastructure (PKI) usage, a digital certificate is used to cryptographically bind an identity of an entity (e.g. device) to an associated public key of an asymmetric cryptographic algorithm, such as RSA or elliptic curve cryptography (ECC). At a minimum the certificate includes the identity of the entity, the public key, and a signature of the issuing authority (over those parameters), typically referred to as a Certificate Authority (CA).

One of the problems with digital certificates is that standard procedures to revoke the licenses or conditional access system permissions cannot be easily re-used in systems that make use of cryptographic secrets that are symmetric-algorithm based. One problem, for example, is that for traditional asymmetric-based digital certificates, an efficient way to revoke devices is to group devices by a Sub-CA, so that devices of the same class or model are issued certificates from the same Sub-CA. In case of revocation, the corresponding Sub-CA can be revoked, rather than revoking individual devices. This mechanism, however, is not directly usable for systems where devices make use of symmetric-based cryptographic secrets.

What is needed is a system and method for grouped devices using symmetric keys for authorization to be revoked by revoking sub-CA issued digital certificates in the chain of trust rather than revoking the authorization of individual devices. The present invention satisfies this need.

SUMMARY OF THE INVENTION

To address the requirements described above, the present invention discloses a method and apparatus for enabling provision of a service to a first entity such as a device. In one embodiment, the method comprises receiving a service request in a second entity from the first entity, the service request comprising a leaf digital certificate generated and digitally signed by a certification entity and provided to the first entity, the leaf digital certificate having a unique identifier of the first entity and a two-way cryptographic function of a secret generated according to a provision key unknown to the first entity and the digital certificate digitally signed by a private key of the certification entity according to an asymmetric crypto algorithm, recovering the secret in the second entity from the leaf digital certificate, and enabling provision of the service to the first entity according to the recovered secret.

The foregoing may also be embodied in an apparatus having a communications module and a processor for executing instructions stored in a memory communicatively coupled to the processor, wherein the communications module transceivers information comprising a service request from the first entity, the service request comprising a leaf digital certificate generated and digitally signed by a certification entity and provided to the first entity, the leaf digital certificate having a unique identifier of the first entity and a two-way cryptographic function of a secret generated according to a provision key unknown to the first entity, and the processor instructions include instructions for recovering the secret in the second entity from the leaf digital certificate, and enabling provision of the service to the first entity according to the recovered secret.

The disclosed system and method provides for embedding secret information and/or a function of the secret information in a digital certificate. In one aspect of the invention, a system and method is provided wherein a function $F(S)$ of a secret information S, which is to be associated with an entity, is included into a digital certificate issued to the entity. In one or more embodiments, the function is a one-way function, such as a cryptographic hashing function $H(S)$ (e.g. SHA 1 or SHA256). In one or more other embodiments, the function is a two-way function, such as an encryption function $E(S)$ (e.g. AES or RSA using global encryption/decryption keys).

The systems and methods described herein are useful in many scenarios, for example, in allowing the use of a standard certificate revocation mechanism even for a system where each entity may not be configured with a public/private key pair, but instead is configured with a symmetric secret. The system and method allows for the reuse of a standard digital certificate and standard revocation mechanism for devices that make use of cryptographic secrets that are based on symmetric cryptographic algorithms. This solution is not only applicable to conditional access systems or digital rights management systems, but any communication system where authentication is required for access.

In one or more embodiments, a system and method is provided for embedding symmetric keying secrets into a standard X.509 certificate (encrypted via a "global symmetric key" or "global asymmetric key" stored at the certification entity). In exemplary applications, this may be used as an alternative to standard certificate-based asymmetric key methods. The advantage is that some devices only support the use of symmetric keys (e.g. AES or 3DES) and such hardware limitations prevent the use of asymmetric key approaches.

Additionally, a same sub-CA based certificate revocation may be utilized as well. A sub-CA may be used for different categories of devices (e.g. based on location, device model, etc). In such a case, revoking a particular device model or devices made from a particular location is as easy as revoking the corresponding Sub-CA. Revoking a single Sub-CA certificate is much more scalable and less error-prone as opposed to maintaining a huge list of revoked devices which are all devices of the same model.

In other exemplary applications, the system and method is used with a CAS or DRM system (e.g. Motorola™ Secure Media™) that relies on hardware-protected symmetric keys to authenticate a device. In some cases, an operator may require all DRM keys to remain in the hardware/device, but the chip hardware only supports symmetric algorithms, such as AES or 3DES.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Figure 1:
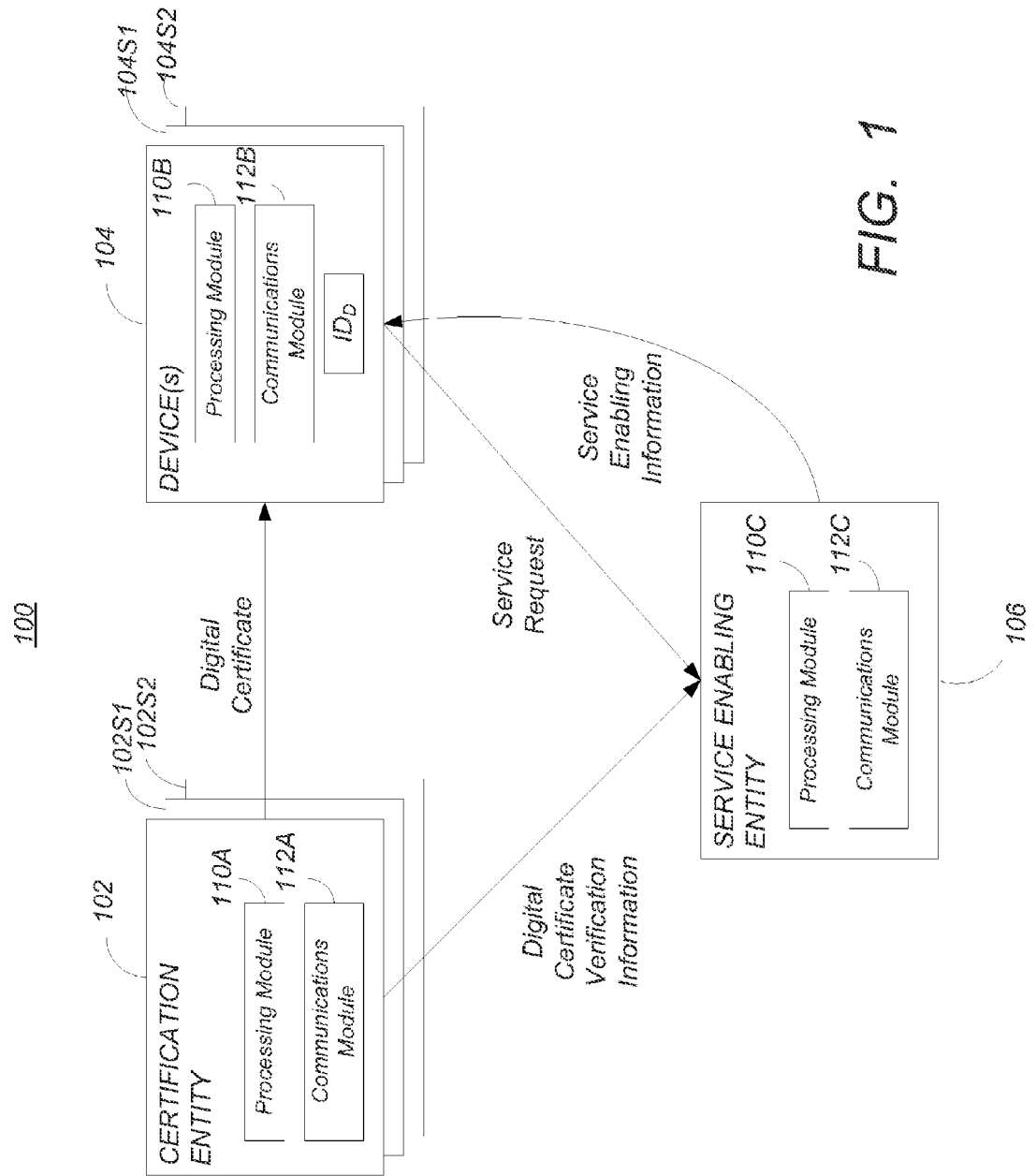
FIG. 1 is a diagram illustrating one embodiment of a conditional access/authentication system.

FIG. 1 is a diagram illustrating one embodiment of a conditional access system 100. The conditional access system 100 comprises a certification entity 102, which may comprise a certificate authority (CA) or a key manager (KM), one or more service entities or devices 104 (hereinafter alternatively referred to as device or devices), and a service enabling entity 106, which may be a server or analogous system.

The certification entity 102, device 104 and service enabling entity 106 each may comprise an associated processing module 110A-110C respectively, and an associated communications module 112A-112C, respectively, for performing processing and communication functions as described further herein. Further, each device 104 may be associated with an identifier (ID) such as a serial number, electric serial number, or other identifier.

The service enabling entity 102 provides the device 104 with conditional access information necessary to access and use content, other information, or services, stored, received or processed by the device 104. Such information may include algorithms, keys, secrets, or other information for use in decoding content. Typically, the device 104 sends a message to the service enabling entity 106 requesting the conditional access information, and service enabling entity, after verifying the identity of the requesting device 104, the service enabling entity 106 transmits the conditional access information or a secure means by which such information may be obtained to the device 104. The service enabling entity 106 may be the same entity that provides the content to the device 104, or may be an independent third party contracted by the content provider to provide the conditional access information in accordance with the security directives of the content provider of the author of the content itself.

An important aspect of the process of providing conditional access information to the device is for the different entities to establish that the entities from which they communicate information are, in fact, the entities they represent to be. This aspect is enabled, at least in part, by digital certificates issued to one or both of the device 102 and service enabling entity 106 by a trusted third party such as the certification entity 102.

Device Secrets Embedded in Certificates Using a One-Way Cryptographic Function

During device 104 manufacturing (or entity provisioning in general), the certification entity 102 or key management function is responsible for provisioning the devices 104 with device identifiers $ID_D$ and secrets $S_D$ for use in obtaining requested services. This may be accomplished by providing the device 104 with a digital certificate embedded with a one-way cryptographic function of the secret $S_D$. Optionally, the certification entity 102 may also provide the secret $S_D$ to the device 104.

Ordinarily, digital certificates issued from a certification authority include a public key, but the aforementioned certificate issued by the certification authority 102 need not include a public key. Otherwise the digital certificate contains the usual information such as a serial number of the digital certificate, an identity for the device 104, the certification entity 102 identity, as well as a digital signature covering the certificate and signed by the certification entity 102.

In order to allow the service enabling entity 106 to communicate with the devices 104 using the digital certificates, a list of device (ID, secret) pairs are delivered to the service enabling entity 106. The service enabling entity 106 will store this information in its database.

In addition, a certificate revocation list (CRL) may be issued by the certification entity 102 as needed or on a regular basis, and transmitted to the service enabling entity 106. The CRL includes serial numbers of certificates that have been revoked, and may follow the standard X.509 specification.

To obtain service, the device 104 may authenticate itself to the service enabling entity 106 by presenting its digital certificate and other information generated using the device secret, according to a pre-agreed authentication protocol. Upon receiving the digital certificate from the device 104, the service enabling entity 106 performs a verification in which it (1) looks up the identifier $ID_D$ of the device 104 making the request in the database to retrieve the secret $S_D$ associated with the requesting device 104; (2) computes a one way cryptographic function matching the one-way cryptographic function the certification entity 102 used to generate the data embedded in the digital certificate provided to the device 104 and provided to the service enabling entity 106 with the service request; (3) apply the same cryptographic function to the secret $S_D$ associated with the requesting device 104 received from the certification entity 102; (4) verifies the resulting value against the value embedded in the certificate; (5) performs standard certificate chain validation such as verifying the signature, validity period, and that the certificate chains up to the trusted Root certificate. If the value of the one way cryptographic function computed at the service enabling entity 106 matches the value of the one way cryptographic function computed at the certification entity 102, and the standard chain validation is successful, the serial number of the device certificate is compared to the most recently received CRL to make sure that the device 104 certificate (and any CA certificate in the certificate chain) is not on the latest CRL, and that any Sub-CA certificate on the chain that links the device certificate to the trusted Root certificate has not been revoked.

If verification is successful and the certificate has not been revoked, the service enabling entity 106 may proceed to make use of the secret in enabling the provision of the requested service to the device 104. For example, the service enabling entity 106 may proceed to verify other authentication-related information provided by the device 104, based on the pre-agreed authentication protocol. If verification is not successful, the requested service may be denied.

Figure 2:
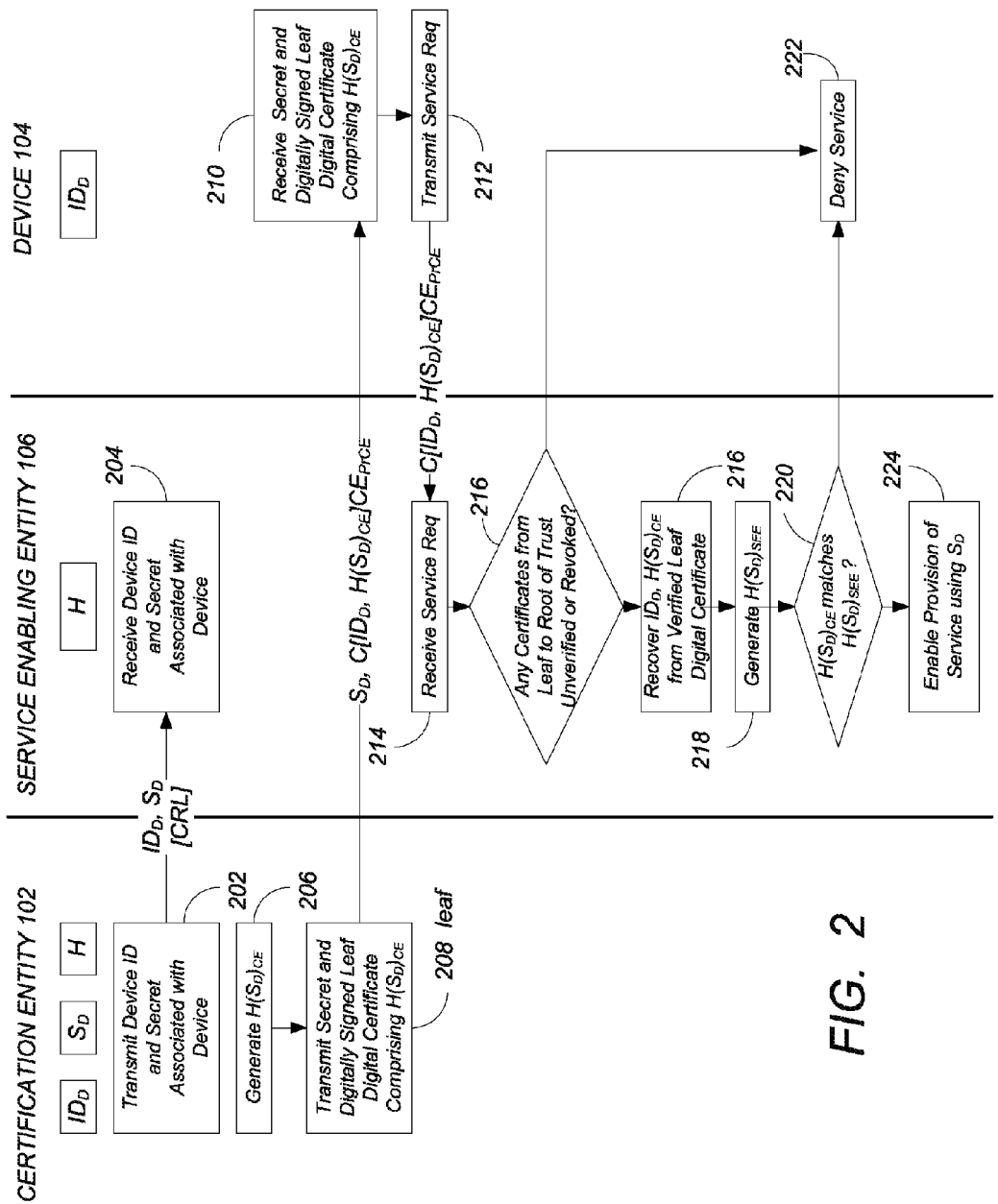
FIG. 2 is a diagram illustrating further details regarding the authentication process using a one-way cryptographic function of a secret embedded in a digital certificate.

FIG. 2 is a diagram illustrating further details regarding the authentication process using a one-way cryptographic function of a secret embedded in a digital certificate. The device 104 is associated with at least one identifier $ID_D$. In one embodiment, the identifier $ID_D$ is unique to the device 104, however, the identifier $ID_D$ may be unique to a class of devices 104 to be authenticated as well. For example, one of the identifiers $ID_D$ may be unique to devices 104 having a particular software version installed, to devices having a particular functional capability, devices manufactured in a particular location, or devices manufactured within a particular time range. In another embodiment, the device is associated with multiple identifiers $ID_{D1}$, $ID_{D2}$ . . . $ID_{Dn}$ wherein one of the identifiers is unique to the device 104 and another identifier is unique to a class of the devices 104.

The certification entity 102 includes a database or other memory storing each of the device identifiers $ID_D$ for each of the devices 104. The database also stores a secret $S_D$ for each device 104. In one embodiment, the secret $S_D$ is unique to the device 104. The secret $S_D$ may be generated by the certification entity 102 or simply provided to the certification entity by a third party such as the entity that will ultimately provide the content to the device 104.

The certification entity 102 stores or has access to one or more cryptographic functions $F_C[\bullet]$ that are also known to or accessible by the service enabling entity 106. The certification entity 102 applies one of the cryptographic function $F_C[\bullet]$ to the secret $S_D$, thereby generating a cryptographic function of the secret, $F_C[S_D]$. In one embodiment, the cryptographic function is a one-way cryptographic function such as a hashing operation $H[\bullet]$. For exemplary purposes, the one way cryptographic function is described hereafter as a hash, $H[\bullet]$ but as described above, the function may be any one-way cryptographic function. Further, although the same hash function $H[\bullet]$ may be used to hash or otherwise operate on the all of the secrets $S_D$ for all devices 104, different hash operations $H[\bullet]$ may be used for different devices 104 or different device 104 classes to enhance security or to provide further authentication options, so long as the association between the hash functions $H[\bullet]$ implemented in the certification entity 102 and the service enabling entity 106 and the device identifiers $ID_D$ is preserved.

For purposes of simplicity, the operations described below are described with respect to the transmission and use of a single device ID/secret pair. However, it is noted that these operations apply as well in cases where multiple device ID/secret pairs are transmitted and used.

As shown in block 202, the certification entity 102 transmits a device identifier $ID_D$ and the associated secret $S_D$ to the service enabling facility 106. In one embodiment, this device identifier $ID_D$ and $S_D$ are paired and transmitted together from the certification entity 102 to the service enabling entity 106, but this need not be the case, so long as the information is transmitted such that the association between the device identifier $ID_D$ and the secret $S_D$ is known by the service enabling entity 106, whether inferentially or explicitly. Since the secret $S_D$ is private between the certification entity 102 and the service enabling entity 106, the means by which the device ID/secret pair(s) are transmitted is preferably as secure as the desired security by which the service itself is provisioned to the device 104. In embodiments wherein the transmission of the device ID/secret pair is accomplished via insecure communication channels, the device/secret pair may be encrypted by the certification entity 102 before transmission and decrypted by the service enabling entity 106 after receipt. Encryption may be by use of public/private key pairs, SSL, or any other suitable means. In other embodiments, the device ID/secret pair may be transmitted by providing a copy of the ID/secret pairs in a tangible medium by secure means (e.g. courier). The certification entity 102 may also transmit a certificate revocation list (CRL) having information indicating which digital certificates have been revoked.

In block 204, the service enabling entity 106 receives the device identifier/secret, (and the CRL if supplied) and stores them for later use. In block 206, the certification entity 102 generates a cryptographic function of the secret $H[S_D]_{CE}$.

Then, in block 208, the certification entity 102 generates a digital certificate having the identifier $ID_D$ of the device 104 and the cryptographic function of the secret $H[S_D]_{CE}$. The resulting leaf certificate $C[ID_D, H[S_D]_{CE}]CE_{PrCE}$, may be signed, for example, with the certification entity's private key Pr and along with the secret $S_D$, is transmitted from the certification entity 102 to the device 104 as shown in block 208.

The device 104 receives the signed digital leaf certificate $C[ID_D, H[S_D]_{CE}]CE_{PrCE}$ and the secret $S_D$ and stores this information for later use, as shown in block 210. The secret $S_D$ is transmitted to the device 104 securely, either by using a secure transmission channel or by securing the data itself via encryption. The transmission of the signed digital leaf certificate $C[ID_D, H[S_D]_{CE}]CE_{PrCE}$ may likewise be accomplished by secure means.

The device 104 then transmits a service request to the service enabling entity 106, as shown in block 212. The service request includes the signed digital leaf certificate $C[ID_D, H[S_D]_{CE}]CE_{PrCE}$ that the device 104 received from the certification entity 102, and other information generated using the device secret $S_D$ according to a pre-agreed authentication protocol. The service enabling entity 106 receives the service request, as shown in block 214.

The service enabling entity 106 may be the entity that provides the service itself (for example the service enabling entity 106 itself may transmit the desired information to the device 104). However, the service enabling entity 106 may simply provide the information required to enable the device 104 to receive the desired information, while another entity (such as a content provider) provides the desired information itself.

In block 216, the service enabling entity 106 determines whether there are any certificates from the leaf certificate to a root of trust certificate that are unverified or revoked. This can be accomplished by performing certificate chain validation to verify that the leaf certificate chains up to the trusted root certificate. This process includes verifying the signature of the leaf certificate using the public key of the CA certificate issuing this certificate, and the other attributes in the leaf certificate such as validity period; verifying the next level CA certificate in the same way until the next level CA certificate is the trusted root certificate.

Figure 3:
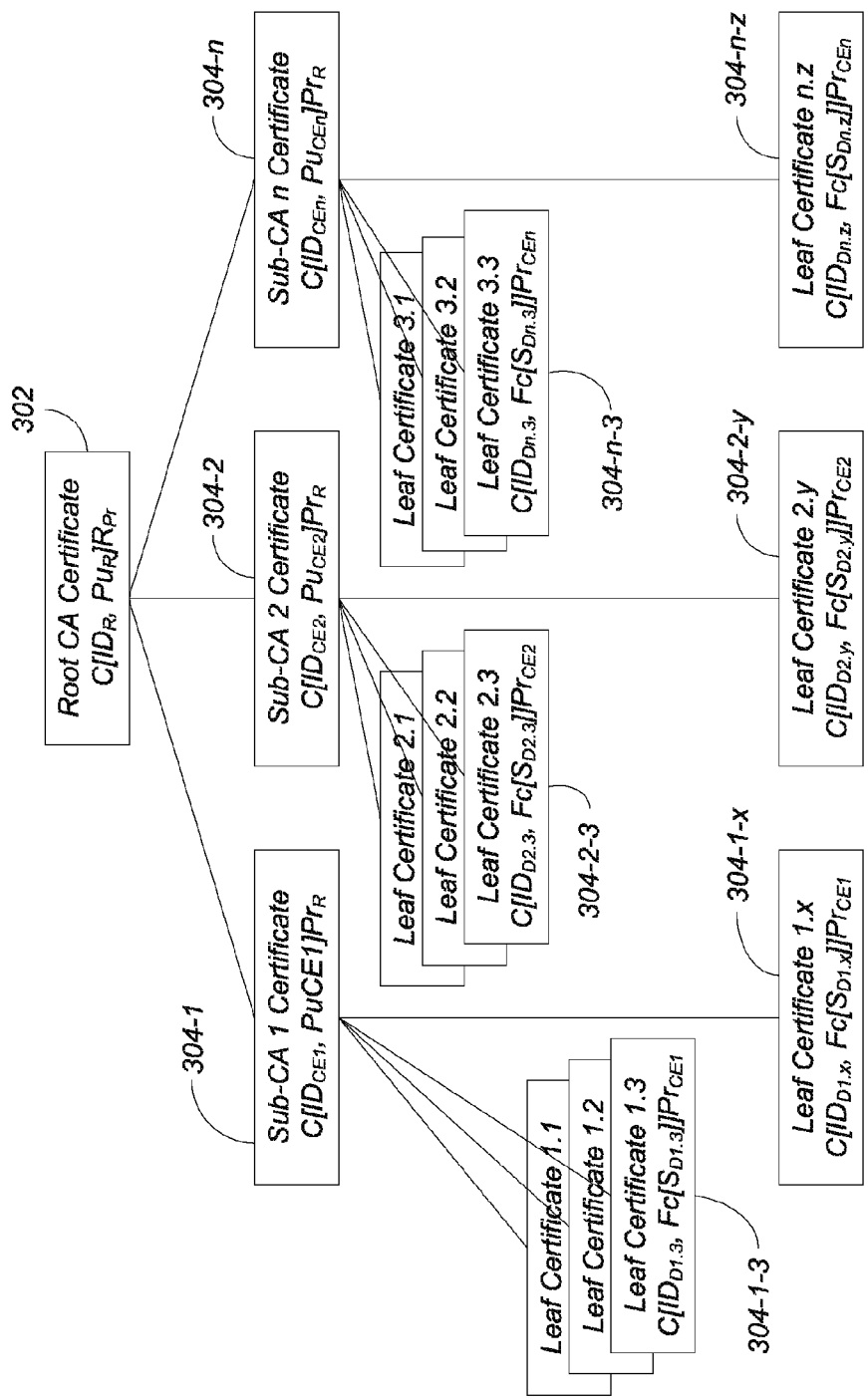
FIG. 3 is a diagram illustrating a typical 3-level certificate hierarchy.

FIG. 3 is a diagram illustrating a typical 3-level certificate hierarchy a Root Certificate Authority (CA) self issuing a root certificate 302 and issuing a number of Subordinate CA (Sub-CA) certificates 304-1 through 304-$n$. Each Sub-CA 304-1 through 304-$n$ is then used to issue leaf certificates 304-1-1 through 304-$n$-$z$ for a group or a class of devices. When a group or class of device certificates are to be revoked, (the serial number of) the Sub-CA certificate can be described by the CRL, instead of putting all (the serial numbers of) the device certificates into the CRL. Note that this mechanism exists for digital certificates that includes the public key of the entity to which the certificate is issued to. The current invention allows the same mechanism to be used for digital certificates that include a cryptographic function of a shared secret instead of a public key. Note that in the certificate hierarchy, the Root 302 and Sub-CA 304-1 through 304-$n$ certificates may be traditional standard digital certificates with public keys. Only the leaf certificates have the embedded cryptographic function of the secrets $S_D$.

All of the certificates 302, 304-1 through 304-$n$, and 304-1-1 through 304$n$-$z$ may be issued and managed by different certification entities 106 or the same certification entity 106. The root certificate 302 forms the root of trust and is communicated to the service enabling entity 106 using a secure channel, and thereby establishing the root of trust at the service enabling entity 106. The root certification entity issues the sub-certification entity digital certificates 304-1 through 304-$n$ having an ID of the sub-certification entity (CEn), the public key of the sub-certification entity, and is signed by the private key of the entity issuing the root certificate. The public key of the entity issuing the root certificate can be used by to validate the sub-certification entity digital certificates 304-1 through 304-$n$, thus rendering those digital certificates as trusted, by virtue of the root of trust. The sub-certification entities can issue the leaf digital certificates 304-1-1 through 304-$n$-$z$, which are typically signed by the private key of sub-certification entity issuing the leaf certificate and include the identifier of the first entity 106 and a one-way cryptographic function of the secret $S_D$. The leaf digital certificates 304-1-1 through 304-$n$-$z$ having the cryptographic function Fc (one way or two way) of the secret $S_D$ can be verified via the public key of the sub-certification entity issuing the leaf digital certificates.

The certification entity 102 may provide a list of a set of previously issued digital certificates that have been revoked. This certificate revocation list (CRL) may provided to the service enabling agency 106 periodically, aperiodically, in response to different service enablement requirements, as the devices 104 are enabled or disabled or simply as deemed necessary. In one embodiment, the CRL comprises a list revoked certificate serial numbers. However, in other embodiments, the CRL may comprise identifiers $ID_D$ of devices for which the certificates have been revoked instead of or in addition to the serial numbers of the revoked certificates. Alternatively, the certification authority may simply provide an updated list of valid certificate numbers, with the service enabling entity 106 simply presuming that a certificate has been revoked it if it is not included on the list. In yet another embodiment, the certification entity 102 revokes a Sub-CA that was used to issue certificates for a class or group of devices instead of listing the individual devices on the CRL.

Once verified, leaf digital certificate is determined to be sourced by the sub-certificate entity, and though further verification of the sub-CA certificate obtained from the certification entity 106 issuing the root certificate 302, all of the digital certificates chained up to the root of trust can be determined to be verified. Further, each certificate up the chain of trust to the root certificate can be checked against a list of the serial numbers or identifiers or revoked certificates to determine if the certificate is revoked. For example, leaf certificate 304-2-3 may be verified though the root of trust issuing the root certificate 302 by verifying leaf certificate 304-2-3 and sub-CA certificate 304-2, and assuring neither certificate has been revoked.

Returning to FIG. 2, if any of the digital certificates from the leaf certificate to the root of trust are unverified or revoked, service is denied, as shown in blocks 216 and 222. If not, the first entity identifier $ID_D$ and hashed secret $H(S_D)_{CE}$ is recovered from the verified leaf digital certificate, as shown in block 216.

The service enabling entity 106 uses the device identifier $ID_D$ to look up the secret $S_D$ associated with the device 104 that sent the service request, and, using the same cryptographic function H[●] as the certification entity generates its own version of the cryptographic function of the secret $H[S_D]_{SEE}$, as shown in block 218.

In block 220, the service enabling entity-generated version of the cryptographic function of the secret associated with the identifier of the device 104 making the service request $H[S_D]_{SEE}$ is compared to the certification entity-generated version of the secret obtained from the digital certificate $H[S_D]_{CE}$. If $H[S_D]_{CE}$ and $H[S_D]_{SEE}$ do not match, either the cryptographic function H[*] employed by the certification entity 102 and the service enabling entity 106 do not match, or the secrets operated on by those cryptographic functions do not match. Either case indicates a compromise or error, and block 220 passes processing to block 222, in which the requested service is not provided. A message indicating that the requested service has been denied may be sent to the device 104 for presentation to the user of the device 104, allowing the user of the device 104 to take remedial action, perhaps by contacting the provider of the requested service.

It is noted that ordinarily the expected match is such that $H[S_D]_{CE}$ and $H[S_D]_{SEE}$ are identical, but this need not be the case. In some circumstances only a portion of $H[S_D]_{CE}$ and $H[S_D]_{SEE}$ need to be equal for to establish a "match," hence, for purposes of this disclosure the term "match" is used to convey that $H[S_D]_{CE}$ and $H[S_D]_{SEE}$ are close enough in relevant character to conclude that the same secret was used to generate both values.

Other embodiments are possible in which the same revocation functionality is provided with different CRL content or without the need for a CRL. For example, rather than transmitting a CRL, the certification entity 102 may occasionally transmit the device identity $ID_D$ and secret $S_D$ for all approved devices 104 to the service enabling entity 106, and revocation of a particular device 104 may be effected by excluding the device identity $ID_D$ from that transmission. Or, the device identity $ID_D$ of devices 104 or the certificate serial numbers for which service is no longer approved may be included in the transmission, but the secret $S_D$ associated with revoked devices 104 set to zero or another value that will not result in the match described above. Further, an analogous functionality can be effected via change in the cryptographic function H[●] instead of or in addition to the secret $S_D$. For example, service enablement of all of the devices 104 or a particular class of devices 104 may be disabled if the cryptographic function H[●] associated with those devices 104 is changed. The new cryptographic function H[●] may be communicated to the service enabling entity 106, thus invalidating any previously issued digital certificates C[●] issued using the previous cryptographic function H[●].

If $H[S_D]_{CE}$ and $H[S_D]_{SEE}$ match, the logic of block 220 enables provision of the requested service, as shown in block 224. Such enablement may be made by the transmission of other information to the certification entity 102, the device 104 or the entity actually providing the service to the device 104. Alternatively, the service enabling entity 106 may make use of the secret as a shared secret to authenticate the device 104 using a predetermined authentication protocol. The secret $S_D$ may also include secret information about the device 104 such as device functional capabilities or the location of sensitive data stored by the device 104, and this information can be used to enable the requested service.

Device Secrets Embedded in Certificates Using a Two-Way Cryptographic Function

This embodiment functions similarly to the embodiment described above except that a two-way cryptographic function is employed instead of a one-way cryptographic function. During device 104 manufacturing (or entity provisioning in general), the certification entity 102 or a key management function is responsible for provisioning identities $ID_D$ and secrets $S_D$ into devices 104. In this case, the device 104 is provisioned with a digital certificate (C[●]). The digital certificate C[●] may not contain a public key as typically the case. Instead, a two-way cryptographic function of the secret $S_D$ is embedded in the digital certificate C[●]. The two-way function may be a cryptographic secure function such as a symmetric encryption operation such as AES-encryption using a global AES provisioning key K known only to the certification entity 102, and the service enabling entity 106. The two-way function may also be a cryptographic function such as an asymmetric encryption operation such as RSA-encryption using a global RSA key pair: $K_e$ and $K_d$, where the $K_e$ is an RSA public key used for encryption; and $K_d$ is a corresponding RSA private key used for decryption. Otherwise, the digital certificate C[●] may include the usual information such as a serial number identifying the digital certificate, an identity for the device 104, the identity of the certification entity 106, as well as a digital signature covering the certificate and signed by the certification entity 102.

The device 104 is then provided with the certificate with the embedded encrypted secret, and the secret $S_D$. In this embodiment, the certification entity 102 need not provide a list of the device identifier/secret ($ID_D$/$S_D$) pairs to the service enabling entity 106, but provides (to the service enabling entity 106) the global provisioning key K that was used to encrypt the secrets $S_D$ embedded in the digital certificates provided to each device 104. Alternatively, if the encryption algorithm (for encrypting the secret) is asymmetric, the certification entity and the service enabling entity may agree on the global pair of encryption and decryption keys, such that the certification entity 102 will use the encryption key ($K_e$) for encrypting the secret $S_D$, and the service enabling entity 106 will use the corresponding decryption key ($K_d$) for decrypting the secret. One way of achieving this is for the service enabling entity to generate the key pair ($K_e$ and $K_d$), and then share the encryption key ($K_e$) with the certification entity.

To enable revocation of issued certificates, the certification entity 102 may provide a certificate revocation list (CRL) to the service enabling entity 106. This CRL includes the serial number of the leaf digital certificates 304-1-1 though 304-n-x that have been revoked or the identifiers of devices having revoked certificates, and may follow the standard X.509 specification. The certification entity 102 may also revoke one or more of the Sub-CAs 304-1 through 304-n that was used to issue leaf certificates 304-1-x through 304-n-x for a class or group of devices 104 instead of listing the individual devices 104 on the CRL, thus revoking the certificates for all the devices 104 in that class or group. For example, revoking sub-CA certificate 304-1 will effectively revoke the digital certificates for leaf certificates 304-1-1 though 304-1-x.

To obtain service, the device 104 makes a service request to the service enabling entity 106, using a combination of its secret $S_D$ and its digital certificate to authenticate to the service enabling entity 104, based on a predetermined authentication protocol. The service enabling entity 106 then performs a verification that includes (1) a standard certificate chain validation, which may include verifying the signature, validity period, and that the certificate chains up to the trusted root certificate 302, and (2) verifying that the leaf digital certificate and all of the digital certificates chaining up to the root certificate have not been revoked according to the CRL. This may be accomplished by assuring that the serial number of the device certificate or any Sub-CA certificates linking the device certificate to the trusted root certificate is not on the CRL.

If successful, the service enabling entity 106 may extract the encrypted secret embedded in the certificate and decrypt it using the global decryption key K (or $K_d$ in the case of asymmetric encryption) provided by or agreed with the certification entity 102, thus recovering the secret $S_D$. The service enabling entity 106 may then use of the secret $S_D$ to enable the provision of the requested service to the device 104. For example, the secret $S_D$ may used to authenticate the device using a pre-determined authentication protocol. In addition, secrets $S_D$ may contain secret information about the device 104 such as device capabilities.

Figure 4:
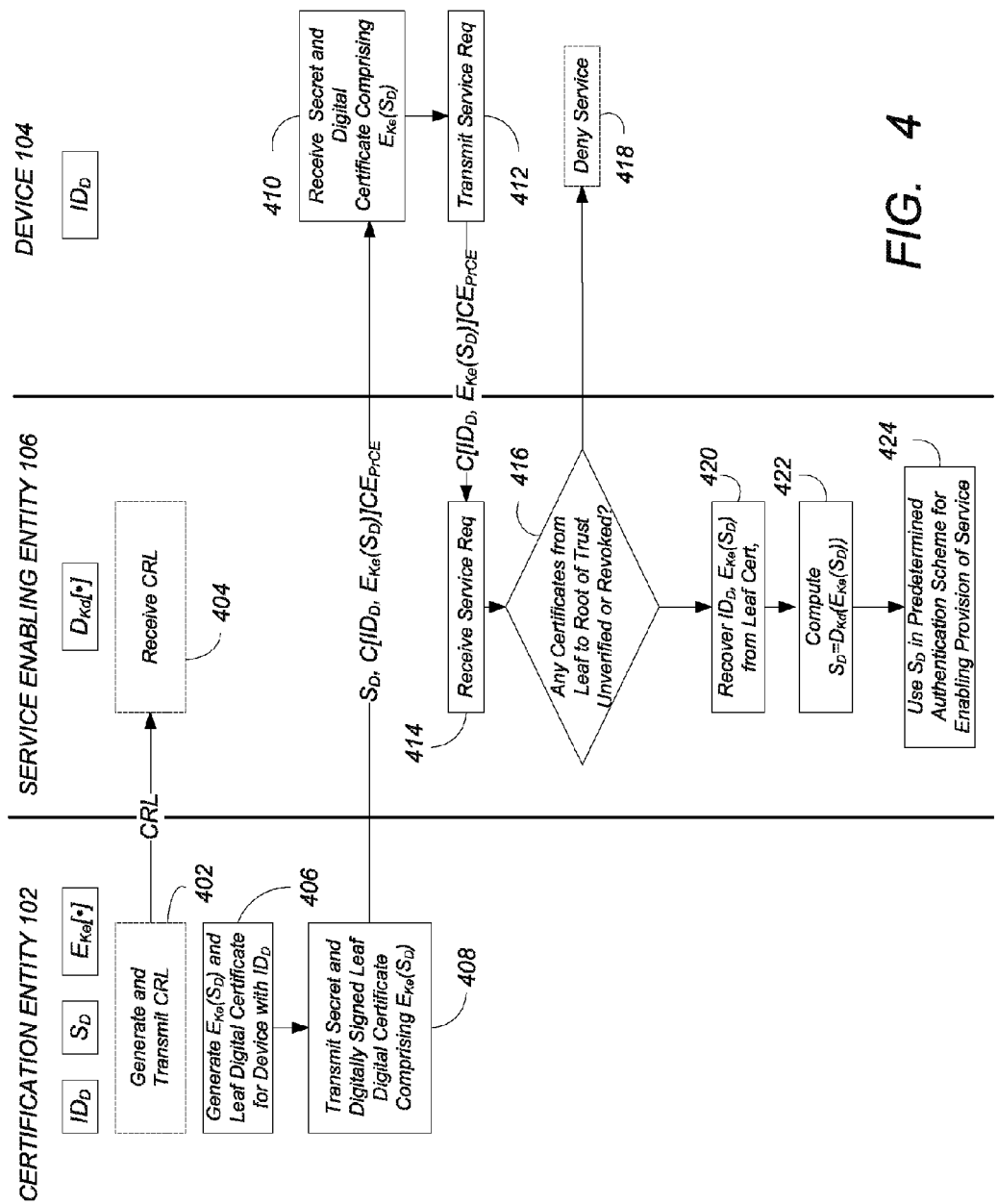
FIG. 4 is a diagram illustrating further details of an exemplary embodiment of an authentication process using a two-way cryptographic function $F_C[\bullet]$ of a secret embedded in a digital certificate.

FIG. 4 is a diagram illustrating further details of an exemplary embodiment of an authentication process using a two-way cryptographic function $F_C[●]$ of a secret embedded in a digital certificate. In this embodiment, the device 104 is also associated with at least one identifier $ID_D$, which may be unique to the device 104 or a class of devices 104 to be authenticated. Each device 104 may also be associated with multiple identifiers $ID_{D1}$, $ID_{D2}$ ... $ID_{Dn}$ wherein one of the identifiers is unique to the device 104 and another identifier is unique to a class or subset of the devices 104.

The certification entity 102 includes a database or other memory storing each of the device identifiers $ID_D$ for each of the devices 104. The database also stores a secret $S_D$ for each device 104. In one embodiment, the secret $S_D$ is unique to the device 104. Accordingly, at least one secret $S_D$ that is uniquely associated with a particular device 104 can be ascertained by the certification entity 102.

As with the embodiment using the one-way cryptographic function, the certification entity 102 and service enabling entity 106 of this embodiment also stores or has access to one or more cryptographic functions $F_C[●]$, and the certification entity 102 applies the cryptographic function $F_C[●]$ to the secret $S_D$, thereby generating a cryptographic function of the secret $F_C[S_D]$. In this embodiment however, the cryptographic function is a two-way cryptographic function. For exemplary purposes, the two way cryptographic function is described hereafter as a encryption operation, $E_K[\bullet]$ but as described above, the two-way cryptographic function may be any two-way cryptographic function. Although the same encryption function $E_K[\bullet]$ may be used to encrypt or otherwise operate on the all of the secrets $S_D$ for all devices 104, different encryption functions or encryption functions employing different provisioning keys KD may be used for different devices 104 or different device 104 classes to enhance security or to provide further authentication options. Further, as described above, the encryption function $E_K[\bullet]$ may be symmetric, e.g. the same provisioning key K is used to encrypt the data as is used to decrypt it $D_K[\bullet]$. Or, the encryption function may be asymmetric with keys Ke and Kd wherein Ke is an encryption key for the encryption function $E_{Ke}[\bullet]$ and Kd is an associated decryption key for the associated decryption function $D_{Kd}[\bullet]$.

As was the case with the one way cryptographic function embodiment the operations described below are described with respect to the enabling of a single device 104, but it is noted that these operations apply as well in cases where multiple devices 104 are enabled.

Preliminary to the illustrated operations, the certification entity 102 and the service enabling facility 106 agree on the provisioning key or keys. If a symmetric encryption algorithm is used, the same provisioning key K is used for both encryption key and decryption, whereas if an asymmetric encryption algorithm is used, an encryption key Ke is used for encryption and a decryption key Kd is used for decryption. Hence, the symmetric encryption algorithm embodiment may be seen as a special case of the asymmetric encryption algorithm embodiment wherein Ke=Kd. FIG. 4 is discussed with regard to the asymmetric encryption algorithm embodiment, but an analogous result may be realized in the symmetrical algorithm embodiment wherein the provisioning key K=Ke=Kd.

Either entity may generate the provisioning key K for use with symmetric encryption algorithms and securely share with the other entity. Or both entities may execute a key agreement algorithm to arrive at the same key together (e.g. using the Diffie-Hellman algorithm).

If an asymmetric encryption algorithm is used, then a key pair including an encryption key Ke and an associated decryption key Kd is needed. In this case, the certification entity 106 needs to know the encryption key Ke, while the service enabling facility needs to know the decryption key Kd. One way of achieving this is for the service enabling entity 106 to generate the key pair (Ke and Kd), and then share the encryption key (Ke) with the certification entity.

In block 406, the certification entity 102 generates a two-way cryptographic function of the secret $E_{Ke}[S_D]$, wherein the encryption key Ke equals the decryption key Kd in the symmetric encryption algorithm embodiment. The two-way cryptographic function may comprise an AES-encryption function performed according to key Ke or an RSA-encryption function performed according to key Ke.

Then, in block 408, the certification entity 102 generates a digital certificate having the identifier $ID_D$ of the device 104 and the cryptographic function of the secret $E_{Ke}[S_D]$. The resulting certificate $C[ID_D, E_{Ke}[S_D]]$ is signed by the private key of the certification entity to produce $C[ID_D, E_{Ke}[S_D]]CE_{PrCE}$ and is transmitted from the certification entity 102 to the device 104 as shown in block 408.

The device 104 receives the digital certificate $C[ID_D, E_{Ke}[S_D]]CE_{PrCE}$ and the secret $S_D$, and stores this information for later use, as shown in block 410. Preferably, this information is transmitted by secure means, either by using a secure transmission channel or by securing the data itself via encryption. In a preferred embodiment, the secret $S_D$ and signed digital certificate $C[ID_D, E_{Ke}[S_D]]CE_{PrCE}$ are transmitted in the same message, but this need not be the case.

The device 104 then transmits a service request to the service enabling entity 106, as shown in block 412. The service request includes the signed digital certificate $C[ID_D, E_{Ke}[S_D]]CE_{PrCE}$ that the device received from the certification entity 102 and may include other information generated based on the secret $S_D$ according to a predetermined authentication algorithm. The service enabling entity 106 receives the service request, as shown in block 414.

As before, the service enabling entity 106 may be the entity that provides the service itself (for example the service enabling entity 106 itself may transmit the desired information to the device 104). However, the service enabling entity 106 may simply provide the information required to enable the device 104 to receive the desired data, while another entity provides the desired data itself.

As shown in block 416, the service enabling entity 106 then verifies the leaf digital certificate and all the certificates in the chain of certificates extending to the root of trust, and assures that the certificates in the chain are not revoked. This can be accomplished using the CRL transmitted to the service enabling entity 106 in blocks 402-404. If any certificate in the chain is unverified or revoked, service is denied, as shown in block 418. If all of the certificates in the chain are verified and unrevoked. The service enabling agency 106 recover the device 104 identifier $ID_D$ and the cryptographic function of the secret created by the certification entity, $E_{Ke}[S_D]$ from the digital certificate $C[ID_D, E_{Ke}[S_D]]$ to, as shown in block 416.

The service enabling entity 106 then decrypts the value $E_{Ke}[S_D]$ using the cryptographic function $D_{Kd}[E_{Ke}[S_D]]$ to recover the secret $S_D$, as shown in block 422.

This certificate revocation list (CRL) is provided to the service enabling agency 106 as needed, and may be transmitted periodically, aperiodically, in response to different service enablement requirements, or as the devices 104 are enabled or disabled. In one embodiment, the CRL comprises a list of device 104 identified by the serial number of the digital certificates. In another embodiment, the CRL may also comprise serial numbers of Sub-CA certificates that have been revoked. In this case, all device certificates issued under a revoked Sub-CA will also be considered revoked, although the serial numbers of the individual device certificates may not listed in the CRLs. This approach allows an efficient way of revoking a group or a class of devices. In block 424, the service enabling entity 106 checks to see if the device has been revoked according to the CRL. If so, block 424 routes processing to block 422.

Other embodiments are possible in which the same revocation functionality is provided with different CRL content or without the need for a CRL, as described with respect to the one way cryptographic function embodiment.

If the device 104 making the request is not revoked according to the previous described check based on the CRL, block 424 uses the secret $S_D$ for enabling provision of the requested service. For example, the service enabling entity 106 may make use of the secret as a shared secret to authenticate the device 104 using a predetermined authentication protocol. The secret $S_D$ may also include secret information about the device 104 such as device functional capabilities or the location of sensitive data stored by the device 104, and this information can be used to enable the requested service.

The foregoing embodiments permit the use of standard digital certificates and revocation mechanisms for use in devices 104 that use symmetric cryptographic secrets rather than encryption techniques such as public/private key pairs. Further, the foregoing also permits issuance of digital certificates under a Sub-CA certificate for a class or category of devices (e.g. based on device 104 model, country where the device 104 is licensed to be used, manufacturer, or manufacturer location). This permits revocation of the digital certificates for a particular device class as easily as revoking the Sub-CA certificate. Revoking a single digital certificate is more scalable and less error prone than maintaining an extensive list of devices 104 and their certificate status or a list of devices with revoked certificates, when such devices can be grouped by class.

To assist in the generation and revocation of certificates applied to a category or class of device 104, the certification entity 102 may be logically partitioned into one or more sub-certification entities 102S1, 102S2, each of which sub-certification entities may issue, manage, and revoke digital certificates applied to a subset of the devices 104S1 and 104S2, respectively as described above. For example, certification sub-entity 102S1 may issue, manage, and revoke digital certificates 304-1 through 304-x for device subset 104S1, which may include, for example, x devices of a particular model number or a particular capability.

Hardware Environment

Figure 5:
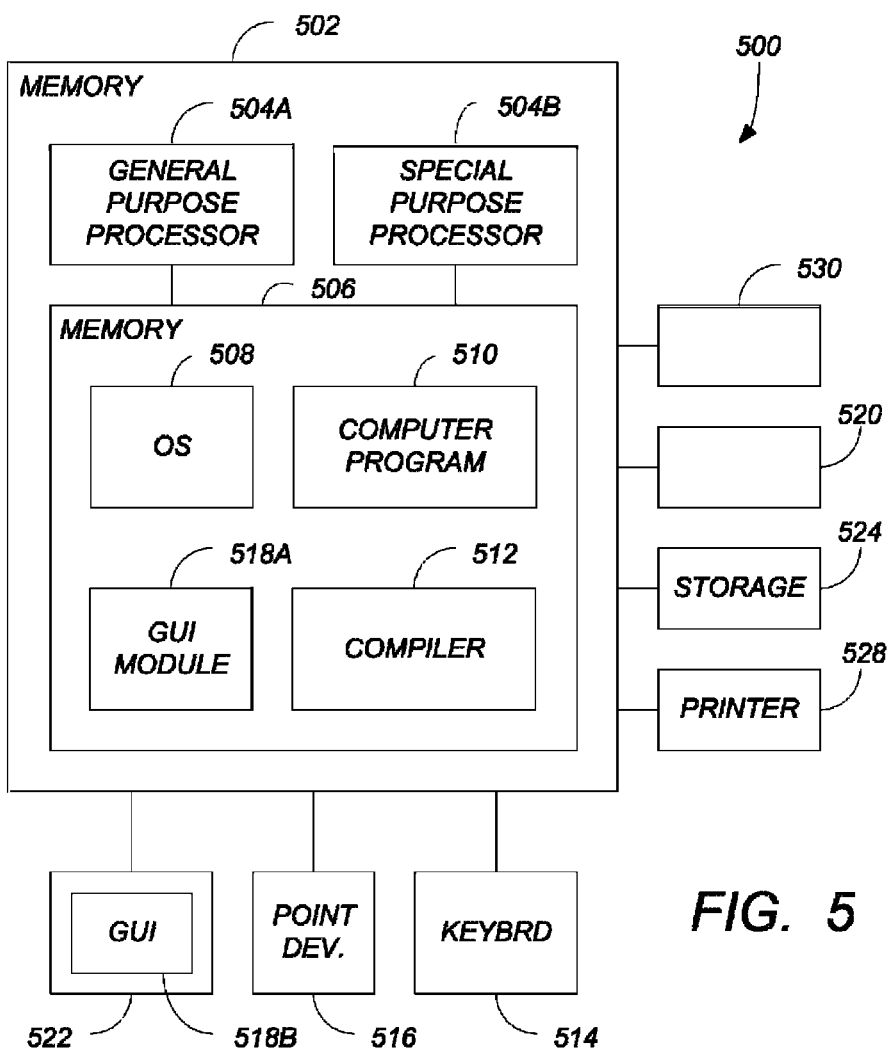
FIG. 5 is a diagram illustrating an exemplary computer system that could be used to implement elements of the present invention.

FIG. 5 is a diagram illustrating an exemplary computer system 500 that could be used to implement elements of the present invention, including the certification entity 102, the device 104 and the service enabling entity 106. The computer 502 comprises a general purpose hardware processor 504A and/or a special purpose hardware processor 504B (hereinafter alternatively collectively referred to as processor 504) and a memory 506, such as random access memory (RAM). The computer 502 may be coupled to other devices, including input/output (I/O) devices such as a keyboard 514, a mouse device 516 and a printer 528.

In one embodiment, the computer 502 operates by the general purpose processor 504A performing instructions defined by the computer program 510 under control of an operating system 508. The computer program 510 and/or the operating system 508 may be stored in the memory 506 and may interface with the user and/or other devices to accept input and commands and, based on such input and commands and the instructions defined by the computer program 510 and operating system 508 to provide output and results.

Output/results may be presented on the display 522 or provided to another device for presentation or further processing or action. In one embodiment, the display 522 comprises a liquid crystal display (LCD) having a plurality of separately addressable pixels formed by liquid crystals. Each pixel of the display 522 changes to an opaque or translucent state to form a part of the image on the display in response to the data or information generated by the processor 504 from the application of the instructions of the computer program 510 and/or operating system 508 to the input and commands. Other display 522 types also include picture elements that change state in order to create the image presented on the display 522. The image may be provided through a graphical user interface (GUI) module 518A. Although the GUI module 518A is depicted as a separate module, the instructions performing the GUI functions can be resident or distributed in the operating system 508, the computer program 510, or implemented with special purpose memory and processors.

Some or all of the operations performed by the computer 502 according to the computer program 510 instructions may be implemented in a special purpose processor 504B. In this embodiment, some or all of the computer program 510 instructions may be implemented via firmware instructions stored in a read only memory (ROM), a programmable read only memory (PROM) or flash memory within the special purpose processor 504B or in memory 506. The special purpose processor 504B may also be hardwired through circuit design to perform some or all of the operations to implement the present invention. Further, the special purpose processor 504B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 502 may also implement a compiler 512 which allows an application program 510 written in a programming language such as COBOL, C++, FORTRAN, or other language to be translated into processor 504 readable code. After completion, the application or computer program 510 accesses and manipulates data accepted from I/O devices and stored in the memory 506 of the computer 502 using the relationships and logic that was generated using the compiler 512.

The computer 502 also optionally comprises an external communication device such as a modem, satellite link, Ethernet card, or other device for accepting input from and providing output to other computers.

In one embodiment, instructions implementing the operating system 508, the computer program 510, and/or the compiler 512 are tangibly embodied in a computer-readable medium, e.g., data storage device 520, which could include one or more fixed or removable data storage devices, such as a zip drive, floppy disc drive 524, hard drive, CD-ROM drive, tape drive, or a flash drive. Further, the operating system 508 and the computer program 510 are comprised of computer program instructions which, when accessed, read and executed by the computer 502, causes the computer 502 to perform the steps necessary to implement and/or use the present invention or to load the program of instructions into a memory, thus creating a special purpose data structure causing the computer to operate as a specially programmed computer executing the method steps described herein. Computer program 510 and/or operating instructions may also be tangibly embodied in memory 506 and/or data communications devices 530, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 502.

Although the term "computer" is referred to herein, it is understood that the computer may include portable devices such as cellphones, portable MP3 players, video game consoles, notebook computers, pocket computers, or any other device with suitable processing, communication, and input/output capability.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A method for using authentication to access video data, the authentication using embedding cryptographically modified versions of secrets in digital certificates to authenticate devices for access to obtain the video data, the method comprising the steps of:
   receiving a service request in a second device entity that provides access to the video, the service request provided from a first device entity needing access to the video,
      wherein the service request comprises a leaf digital certificate generated and digitally signed by a certification entity that has been provided to the first device entity, and
      wherein the leaf digital certificate has a unique identifier of the first device entity and contains the result of hashing of a secret identifier;
   recovering, in the second entity, the hashed secret identifier from the leaf digital certificate;
   authenticating the first device entity by determining if the recovered secret identifier and a device ID match those stored for the first device entity by the second device entity; and
   enabling provision of the service to provide access to the video to the first device entity if the authentication is successful,
      wherein the first device entity is a member of a class of devices, and the certification entity comprises a sub-certification entity providing the leaf digital certificate to the first device entity and other leaf digital certificates to each of the other devices in the class of devices;
      wherein each leaf digital certificate comprises a unique identifier of each associated device and an associated secret unique to the associated device;
      wherein each leaf digital certificate is digitally signed according to a trusted sub-certification entity digital certificate provided by the sub-certification entity; and
   determining if the sub-certification entity certificate or any digital certificate in a chain up to a root of trust has been revoked; and
   verifying the leaf digital certificate only if the trusted digital sub-certification entity digital certificate and any digital certificate in the chain up to the root of trust has not been revoked.

2. The method of claim 1, wherein the leaf digital certificate is further verified according to a public key of the certification entity.

3. The method of claim 1, wherein the step of determining if the trusted sub-certificate has been revoked comprises:
   receiving, from the second entity, a list identifying revoked sub-certification entity certificates; and
   determining that the trusted sub-certification entity certificate has been revoked if the list identifies the trusted sub-certification entity certificate.

4. The method of claim 1, wherein the secret is provided to the first device entity in a same message as the digital certificate by a certificate authority.

5. The method of claim 1, wherein the provision of the service is enabled only if the digital certificate and all digital certificates in the chain from the digital certificate up to a root of trust are not a member of a set of revoked digital certificates.

6. The method of claim 5, further comprising the steps of:
   receiving, in the second entity, a list identifying revoked digital certificates; and
   determining if the digital certificate is among the identified the revoked digital certificates;
   enabling the provision of the service only if the digital certificate and all digital certificates in the chain from the digital certificate up to a root of trust are not among the identified revoked digital certificates.

7. An apparatus for using authentication to access video data, the authentication using embedded cryptographically modified versions of secrets in digital certificates to authenticate devices for access to the video, the apparatus comprising:
   a second device entity providing authentication access to video content upon a request from a first device entity, the second entity comprising:
      a communications module, for transceiving information, wherein the information comprises:
         a service request from the first device entity,
            wherein the service request comprises a leaf digital certificate generated and digitally signed by a certification entity that has been provided to the first device entity, and
            wherein the leaf digital certificate has a unique identifier of the first device entity and contains the result of hashing of a secret identifier;
      a processor, for executing instructions stored in a memory communicatively coupled to the processor, the instructions including instructions for:
         recovering, in the second device entity, the hashed secret identifier from the leaf digital certificate;
         authenticating the first device entity by determining if the recovered secret identifier and a device ID match those stored for the first device entity by the second device entity; and
         enabling provision of the service to provide access to the video to the first device entity if the authentication is successful
            wherein the first device entity is a member of a class of devices, and the certification entity comprises a sub-certification entity providing the leaf digital certificate to the first device entity and other leaf digital certificates to each of the other devices in the class of devices;
            wherein each leaf digital certificate comprises a unique identifier of each associated device and an associated secret unique to the associated device;

wherein each leaf digital certificate is digitally signed according to a trusted sub-certification entity digital certificate provided by the sub-certification entity; and determining if the sub-certification entity certificate or any digital certificate in a chain up to a root of trust has been revoked; and verifying the leaf digital certificate only if the trusted digital sub-certification entity digital certificate and any digital certificate in the chain up to the root of trust has not been revoked.

8. The method of claim 7, wherein the first device entity receives devices Ids and secrets from a certification authority.

9. The method of claim 8, wherein the second device entity functions as a service enabling entity and receives the device IDs and secrets from the certification authority.

10. The apparatus of claim 7, wherein the first device entity receives devices Ids and secrets from a certification authority.

11. The apparatus of claim 10, wherein the second device entity functions as a service enabling entity and receives the device IDs and secrets from the certification authority.

\* \* \* \* \*